United States Patent [19]
Boxall

[11] 3,949,298
[45] Apr. 6, 1976

[54] TIME SHARED DELTA MODULATION SYSTEM

[76] Inventor: Frank S. Boxall, 380 Eleanor Drive, Woodside, Calif. 94062

[22] Filed: Feb. 22, 1974

[21] Appl. No.: 444,822

[52] U.S. Cl............ 325/38 B; 179/15 AP; 332/11 D
[51] Int. Cl.² .......................................... H03K 13/22
[58] Field of Search..... 325/38 B; 179/15 AP, 15 A; 332/11 D

[56] References Cited
UNITED STATES PATENTS

| | | |
|---|---|---|
| 3,091,664 | 5/1963 | Tyrlick .............................. 325/38 B |
| 3,757,252 | 9/1973 | Deschenes et al. ................ 325/38 B |

OTHER PUBLICATIONS

Bucket–Brigade Electronics, Sangster and Teer, IEEE Journal of Solid–State Circuits, Vol. SC–4, No. 3, June 1969, pp. 131 – 136.

Primary Examiner—George H. Libman

[57] ABSTRACT

A multi-channel delta modulation system providing communication between a plurality of analog signal sources and corresponding signal sinks employing a time shared delta modulation encoder and decoder.

20 Claims, 10 Drawing Figures

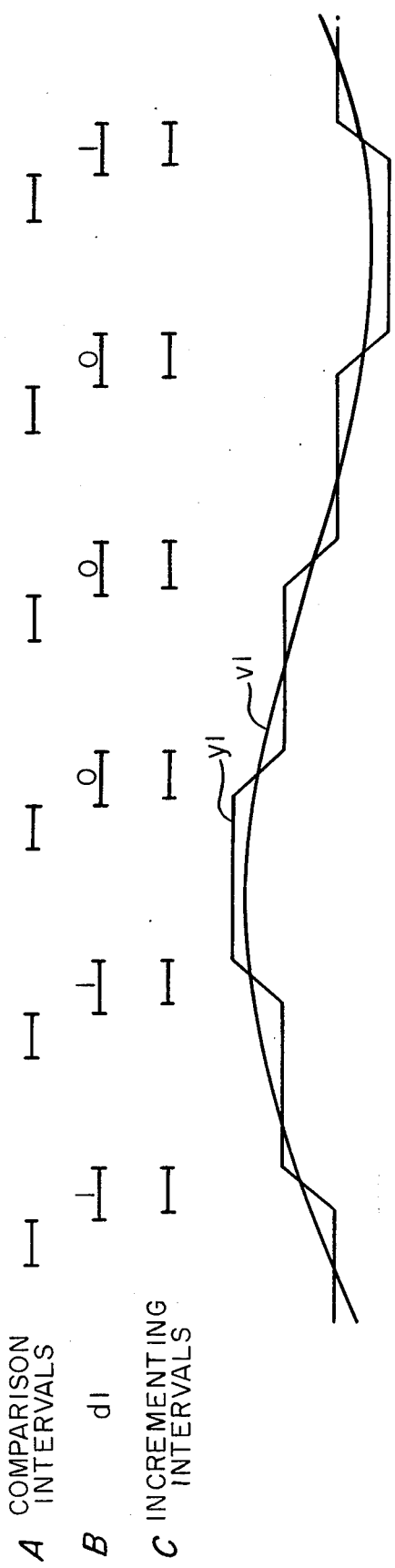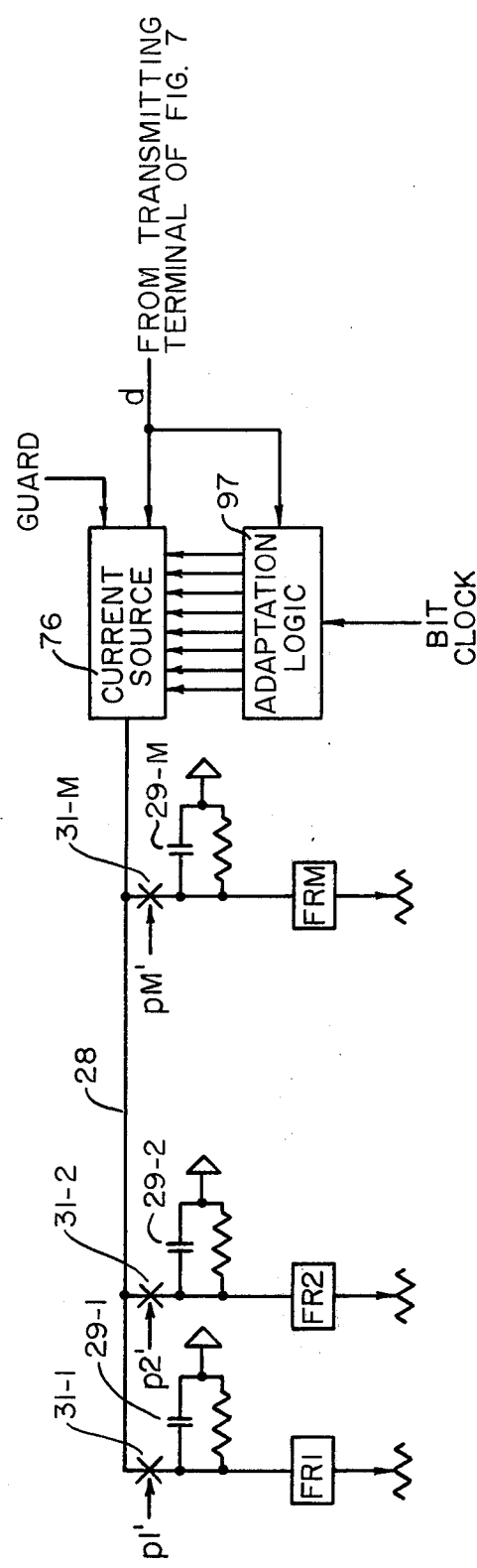
FIG. 3
FIG. 8

1

TIME SHARED DELTA MODULATION SYSTEM

BACKGROUND OF THE INVENTION

This invention relates generally to a multi-channel communication system and more particularly to a multi-channel delta modulation system.

The transmission of analog signals by conversion to digits is well known. In multi-channel systems, economic use of the transmission medium is afforded by employing time division multiplexing of the digital signals.

One method of converting an analog signal to digital form is by employing pulse code modulation. In such systems, the source signal is periodically sampled and the sequence of analog samples is applied to an analog-to-digital converter which generates a representative digital code word for each sample. After transmission, the digital code words are converted to analog samples by applying them to a suitable digital-to-analog converter. Where there are a plurality of analog signal sources, they may be sequentially and periodically sampled to form a time division multiplex of analog signals which is applied to a single analog-to-digital converter to form a time division multiplexed digital signal for transmission. At the receiving end, the multiplexed digital signal is applied to a single digital-to-analog converter. The output of the digital-to-analog converter is applied to an analog demultiplexer which serves to sequentially and periodically distribute the reconstructed analog samples to the corresponding signal sinks.

Another method of converting an analog signal to digital form is by employing delta modulation. In present delta modulation systems, the source signal is periodically compared to an approximating signal stored in a local accumulator. The comparison generates logic 1 or logic 0 according to whether the source signal is greater or less than the accumulator signal. After each comparison, the accumulator signal is incremented one step positively or negatively according to whether the comparison yielded logic 1 or logic 0, thereby providing an up-dated approximation signal for the next comparison. By this mechanism, the local accumulator signal is forced to be a stepped approximation to the source signal. The digital signal generated by the comparison is also transmitted to a receiving accumulator which is identical to the local accumulator. Therefore, the output signal of the receiving accumulator is also a stepped approximation to the source signal.

In the delta modulation process, it is desirable to use a small accumulator step size in order to obtain a close approximation to the source signal. But the maximum rate at which the approximating signal can change is the product of accumulator step size and channel bit rate. If the source signal changes faster than this rate, the accumulators cannot follow closely and the approximating signal is said to be distorted by "slope overload." A delta modulation process in which the accumulator step size is maintained constant is known as linear delta modulation. For many signals (e.g. telephone speech), the linear delta modulation process requires unreasonably high bit rates to avoid excessive slope overload distortion.

This disadvantage has been overcome by the development of "adaptive delta modulation" in which the accumulator step size is dynamically adjusted in accordance with the slope of the source signal, or in accordance with this slope as inferred from observations of the digital signal generated by the comparator. The transmission quality of an adaptive delta modulation channel is comparable to that of a pulse code modulation channel operating at the same bit rate.

In a multi-channel delta modulation communication system in accordance with the prior art, an encoder and decoder is provided for each channel. The digital outputs of the encoders are multiplexed for transmission and demultiplexed upon reception and applied to individual decoders. In view of the fact that there is an encoder and a decoder for each channel, a multi-channel system is relatively expensive even if the individual encoders and decoders are only moderately expensive. Conversely, as previously described, a multi-channel pulse code modulation system requires only one coder and one decoder time shared by all the channels. Consequently, multi-channel pulse code modulation has been more economical than multi-channel delta modulation.

OBJECTS AND SUMMARY OF THE INVENTION

It is an object of the present invention to provide an improved multi-channel time division multiplexed delta modulation system.

It is a further object of the present invention to provide a multi-channel time division delta modulation system in which the encoders and decoders are time shared by the multiple analog signal sources and multiple signal sinks.

The foregoing and other objects are achieved by a multi-channel delta modulation system providing communication channels between a plurality of analog signal sources connected to a transmitting terminal and corresponding analog signal sinks connected to a receiving terminal which includes an analog multiplexer which sequentially samples the analog signals and applies the same to a time shared delta modulation coder to provide a time division digital signal to the associated transmission medium and a time shared delta modulation decoder and demultiplexer for receiving the time division multiplexed digital signals and distributing the reconstructed analog signals to the associated signal sinks.

BRIEF DESCRIPTION OF THE DRAWINGS

FIG. 3 shows the signals associated with one channel of the system of FIG. 1.

FIG. 8 shows the receiving terminal for the transmitting terminal of FIG. 7.

BRIEF DESCRIPTION OF PREFERRED EMBODIMENTS

Figure 1:
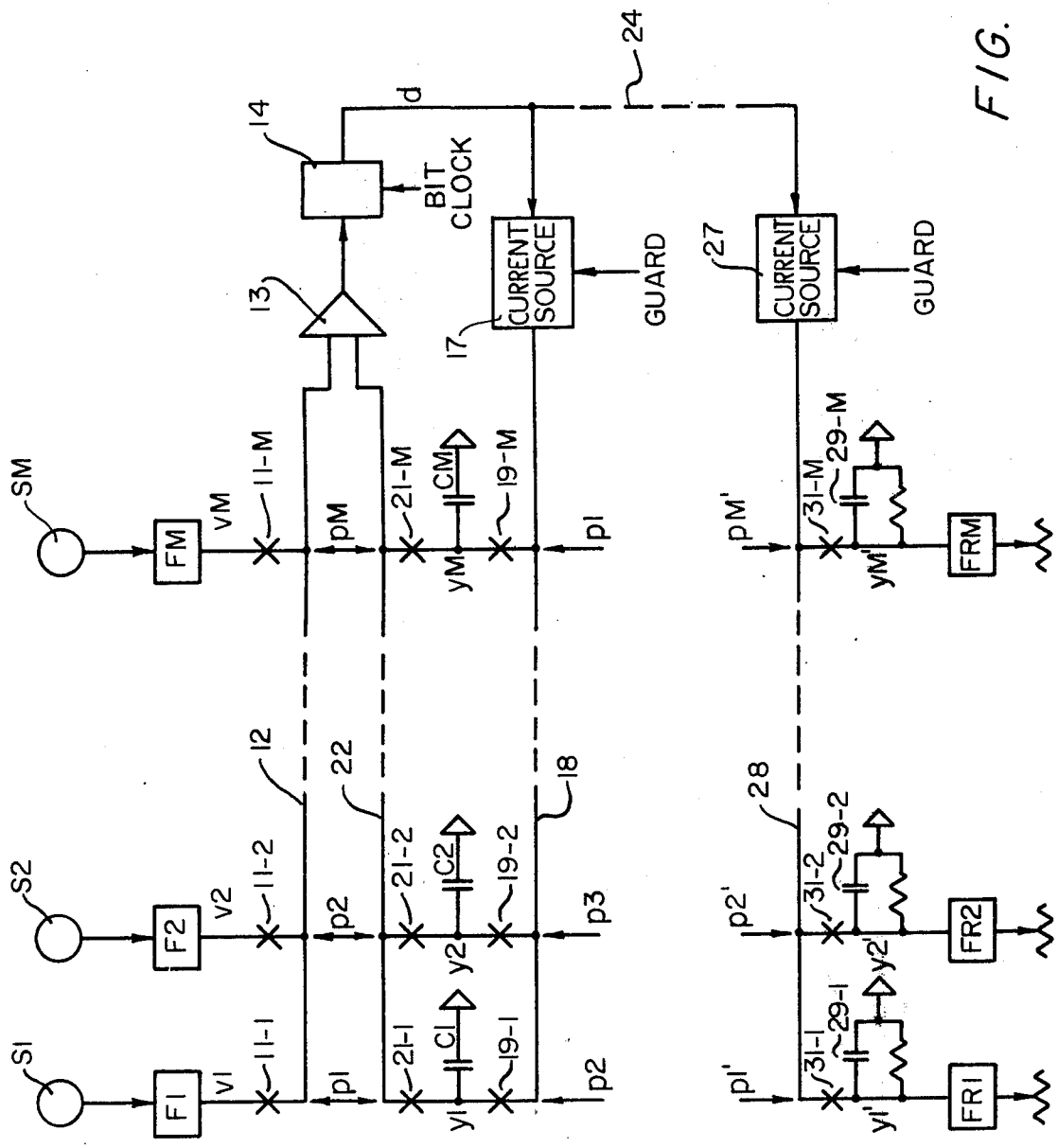
FIG. 1 is a diagram showing a multi-channel linear delta modulation system employing time division multiplexing.

Referring particularly to FIG. 1, there is shown a multi-channel linear delta modulation system employing time division multiplexing. The system is shown used in conjunction with a plurality of signal sources Sl through SM. Low pass filters F1 through FM are connected one to each of the signal sources. The corresponding output signals v1 through vM of each of the filters respectively is connected via a corresponding one of the transmission gates 11-1 through 11-M to line 12. The line 12 is connected to one input of a comparator 13. The output of the comparator is connected to a decision shift cell 14 which is clocked by a bit clock waveform shown in FIG. 2. The digital output signal $d$ (logic 1 or logic 0) from the decision shift cell is applied to the transmission medium 24. The digital output $d$ is also applied to a current source 17 which provides current of fixed magnitude with sign determined by digital signal $d$. The output of the current source is applied via line 18 to a plurality of accumulators which comprise capacitors C1 through CM via gates 19-1 through 19-M. In turn, the output signals y1 through yM of the accumulators are connected to a common line 22 via gates 21-1 through 21-M respectively. The common line 22 forms a second input to the comparator 13. The timing pulses which operate the respective transmission gates are designated p1 through pM and are shown in FIG. 2.

At the receiving terminal, the digital signal d is applied to a current source 27 whose output is connected to a common line 28. The current source provides a current of fixed magnitude, with sign determined by digital signal $d$. The common line 28 is connected to a plurality of accumulating capacitors 29-1 through 29-M via transmission gates 31-1 through 31-M. The output of the accumulators 29-1 through 29-M are designated y1' through yM' and connected to filters FR1 through FRM respectively. The output of each of the filters is connected to the signal sink of a corresponding analog channel. The timing pulses which operate the respective transmission gates are designated $p1'$ through $pM'$ and are shown in FIG. 2.

Each terminal is provided with a time base which generates the sets of timing pulses required for sequential operation of the various system elements. The transmitting terminal output bit stream is organized in repetitive frames with each frame containing one bit for each delta modulation channel, plus additional bits as required for system synchronization or other control purposes. The receiving time base is synchronized to the transmitting time base by providing a framing code, in a framing time slot, which can be uniquely identified at the receiving terminal. Framing, timing, and the like in multi-channel time division multiplex systems are well known and are not referred to the following description. It is understood that an actual system would contain time slots in the frame for these purposes.

Figure 2:
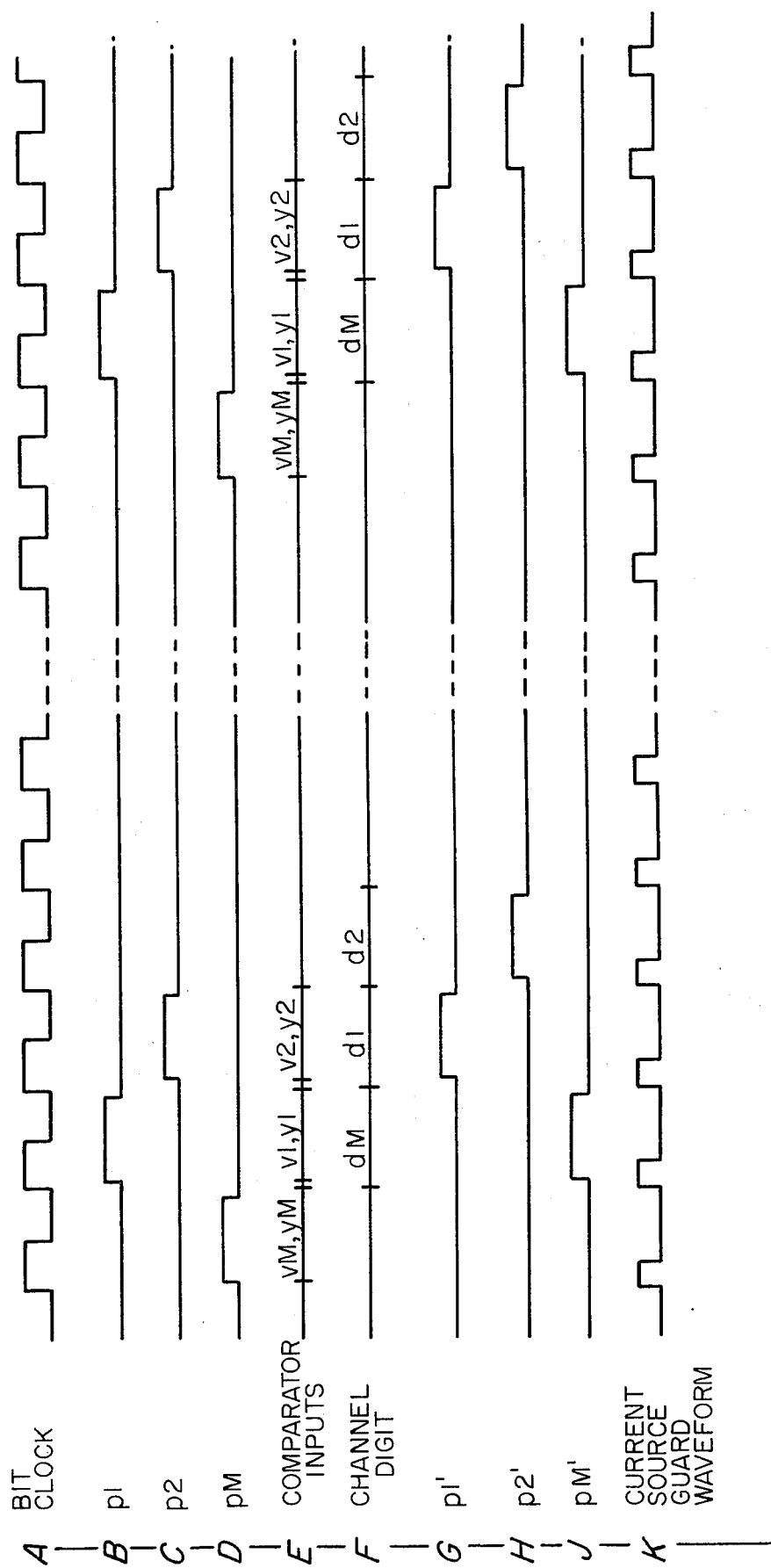
FIG. 2 shows the timing details for the system of FIG. 1.

FIG. 2 shows the timing details for the system of FIG. 1, while FIG. 3 shows waveforms associated with a particular channel, namely channel 1. FIG. 2, line A, is the bit clock waveform applied to the clock terminal of shift cell 14. At each positive rise of bit clock, the shift cell output (signal d) becomes logic 1 if the shift cell input is positive, logic 0 if the shift cell input is negative. This output logic state is sustained until the next positive rise of bit clock.

FIG. 2, line B, is the timing pulse p1 which operates transmission gates 11-1, 21-1, and 19-M. During this interval gates 11-1 and 21-1 apply signals v1 and y1 to the inputs of comparator 13. The next positive rise of bit clock establishes logic signal d1 (logic 1 or logic 0, line F) at the output of shift cell 14 according to whether the comparator output (v1-y1) is positive or negative. FIG. 2, line C, is the timing pulse p2 which operates transmission gates 11-2, 21-2, and 19-1. During this interval gates 11-2 and 21-2 apply signals v2 and y2 to the inputs of comparator 13. Also, during this interval, logic signal d1 rests at the input to current source 17 which provides current to accumulator C1 via gate 19-1. This current of fixed magnitude, and sign determined by logic signal d1, causes the voltage y1 of capacitor C1 to increase or decrease, thereby incrementing signal y1 by one step. The next positive rise of bit clock establishes logic signal d2 at the output of shift cell 14 according to whether the comparator input (v2-y2) is positive or negative. During the next interval, gates 11-3 and 21-3 apply signals v3 and y3 to the inputs of comparator 13, while accumulator signal y2 is incremented by d2 via the current source 17 and gate 19-2. Thus, each channel is sampled, compared, and incremented in turn, once per frame, and the incrementing interval for each channel occurs simultaneously with the comparison interval of the next channel.

FIG. 3 shows signals associated with channel 1 over a time span of several frames. Lines A and C show the comparison intervals and incrementing intervals for channel 1. Curve v1 is the analog signal input for channel 1, curve y1 is the accumulator signal for channel 1. In the first comparison interval v1 exceeds y1 and the resulting digital signal d1 is logic 1 (line B). This causes y1 to be incremented positively in the following incrementing interval as shown. In the next pair of intervals the same events occur again. In the third comparison interval y1 exceeds v1 and the resulting digital signal d1 is logic 0. This causes y1 to be incremented negatively in the third incrementing interval as shown. With the foregoing explanation, the operation of the system is apparent from the figures. Thus, it is evident that the processes described force the accumulator signal y1 to be a stepped approximation to the analog signal v1.

Returning now to FIG. 2, the digital signal $d$ (line F) is transmitted to the receiving terminal. Line G is the timing pulse $p1'$ which operates gate 31-1. During this interval logic signal d1 rests at the input to current source 27 which provides current to accumulator 29-1 via gate 31-1. This current of fixed magnitude, with sign determined by logic signal d1, increments the accumulator voltage $y1'$ by one step. In the next interval, a timing pulse $p2'$ (line H) operates gate 31-2 while logic signal d2 rests at the input to current source 27. Thus, each receiving accumulator is incremented in turn, and each receiving accumulator generates a stepped approximation signal which is a replica of that generated in the corresponding accumulator in the transmitting terminal. The outputs of the accumulators 29-1 through 29-M are connected to the filters FR1 through FRM and thence to the associated channel sink.

In a system of the type described there is a hazard of cross-talk between channels due to overlap of timing pulses. For example, if any two of the gates 19-1 through 19-M are operated simultaneously, then charge can be exchanged between two accumulating capacitors, resulting in inter-channel cross-talk. In order to eliminate this possibility, the channel timing pulses are designed with a guard interval to prevent overlap. The current sources 17 and 27 are also provided with a guard pulse (line K of FIG. 2) which disables the current source, i.e., makes its output zero, through the guard interval between channel pulses.

Each decoder accumulator 29 has a resistor connected across the condenser. Without this resistor, any difference between the magnitude of positive and negative currents from the current source would cause the condenser to gradually accumulate excess charge of one sign, ultimately moving $y'$ beyond the limits of its working range. The resistor provides a discharge path which automatically drains off charge in proportion to the d.c. voltage of the condenser,e thereby holding $y'$ within limits. The combination of condenser and resistor is generally referred to as a "leaky integrator." The encoder accumulator may also be made "leaky" in order to maintain similar characteristics. However, the "leaky integrator" is not a necessity at the encoder because the encoding process makes $y$ follow $v$ regardless of whether the current source is perfectly balanced or not.

The decoder integrator leak also provides a second useful function. If there are occasional digital transmission errors between the encoder and decoder, the decoder will occasionally step in the opposite direction to the encoder and thereby accumulate a d.c. offset error compared to the encoder approximation signal. Accumulated transmission errors might ultimately drive the decoder outside its normal working range. However, the leak resistor provides a discharge path which holds the decoder within its working range.

Because of the decoder integrator leak, a delta modulation channel does not faithfully reproduce very low frequency signals. The value of the leak resistor is chosen so that the low frequency roll-off of the leaky integrator is well below the lowest frequency to be transmitted through the channel. Generally, the requirement to tolerate unbalanced incrementing currents dominates the choice of the leak resistor. In FIG. 1, it is assumed that the receiving low pass filter has a very high input impedance. If not, a suitable amplifier can be inserted between the leaky integrator (accumulator) and the filter.

Finally, it should be noted that the transmitting terminal can operate satisfactorily with a receiving terminal which employs a plurality of delta decoders if the terminal includes an appropriate digital demultiplexer to direct the digits d1 through dM to the appropriate decoder.

Figure 4:
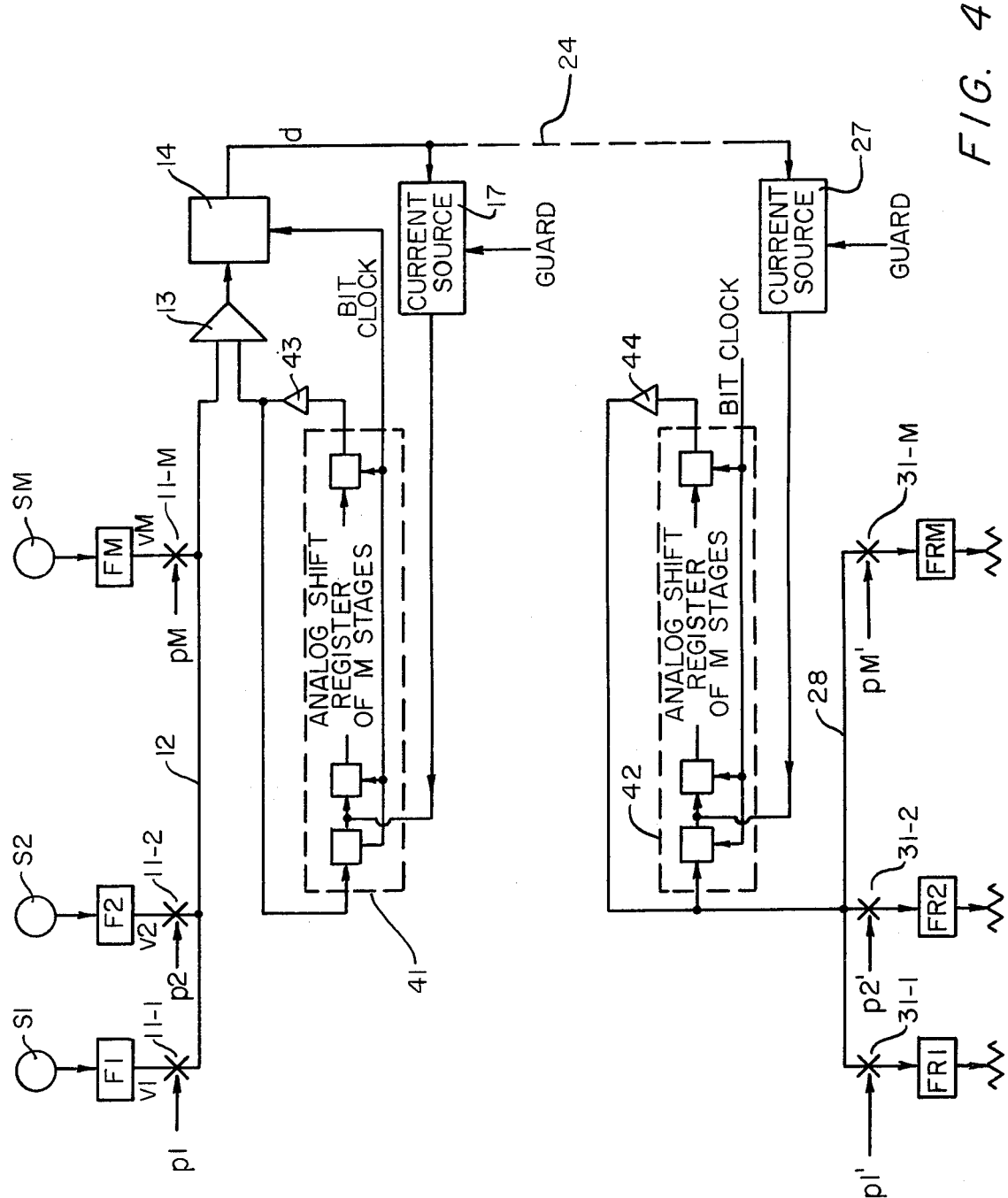
FIG. 4 shows another multi-channel linear differential pulse code modulation system employing analog shift registers.

Rather than employing a plurality of accumulators and transmission gates 19-1 through 19-M and 21-1 through 21-M, an analog shift register having one stage for each delta modulation channel may be used, FIG. 4. Where the circuit elements are identical to those of FIG. 1, like reference numerals have been used. The encoder samples $y1$ through $yM$ are stored and circulated within the M stages of the analog shift register. A similar analog shift register 42 may be employed in the receiving terminal. The output of the shift register 41 is connected through amplifier 43 to the comparator 13, and back to the shift register input. Amplifier 43 is included to compensate for any decay which the samples may suffer in transit through the analog shift register. The output of the shift register 42 is connected through amplifier 44 to line 28, and back to the shift register input. The analog shift register may be of the type described by Sangster and Teer, IEEE Journal of Solid-State Circuits, June 1969, Vol. SC-4 No. 3, pages 131–136.

The $y$ samples within shift register 41 are presented sequentially to one of the comparator inputs via the amplifier 43 synchronously with the $v$ samples from the analog sources applied to the other comparator input. Synchronism is assured by clocking the analog shift register with the rising edge of the terminal bit clock waveform. At the end of each comparison interval, the corresponding channel digit $d$ appears at the output of the decision cell. The channel digit determines the sign of the constant current which increments the corresponding $y$ sample in the shift register 41. Incrementing current is injected at the input of the second stage of the analog shift register because at that time the corresponding $y$ sample has been shifted to this point. While this sample is being incremented, the following channel $v$ and $y$ samples are being applied to the comparator inputs. An appropriate guard pulse applied to current source 17 limits the duration of the incrementing current in order to ensure against inter-channel cross-talk. Thus, it is seen that the $y$ samples circulate continuously through the shift register and that they are incremented once on each pass. Each increment moves each $y$ sample towards the corresponding $v$ sample by the given increment. The receiving half of the terminal also uses an analog shift register 42 in which the $y'$ samples are circulated and sequentially incremented by incoming digital signals via the current source 27. Analog shift register 42 is clocked by the receiving terminal bit clock. At the receiver, the gain setting of amplifier 44 is critical. If the gain around the loop exceeds unity, the $y$ samples will grow on each pass eventually driving the system into limit. The gain should be set slightly below unity to ensure stability. Gain less than unity has the effect of simulating the leak function of the leaky integrator in FIG. 1. The same function can be provided by a single large resistor shunt connected at any point on the analog shift register loop. The analog shift register output applies the $y'$ samples in sequential order to the line 28 from which sequentially operated transmission gates 31-1 through 31-M direct the $y'$ samples to the respective filters FR1 through FRM and to the signal sinks.

The receiver distribution system of FIG. 4 differs from that of FIG. 1 in that in FIG. 1 the distribution gates passed incrementing currents to the respective receiving accumulators, whereas in FIG. 4 the distribution gates pass reconstructed analog samples to interpolation filters associated with each channel. The interpolation filter in each channel extracts the signal spectrum from the incoming amplitude samples and delivers the same to the signal sinks. The filter stop band requirements are less stringent than those for pulse code modulation systems because the rate of the pulse amplitude samples is much higher.

Figure 5:
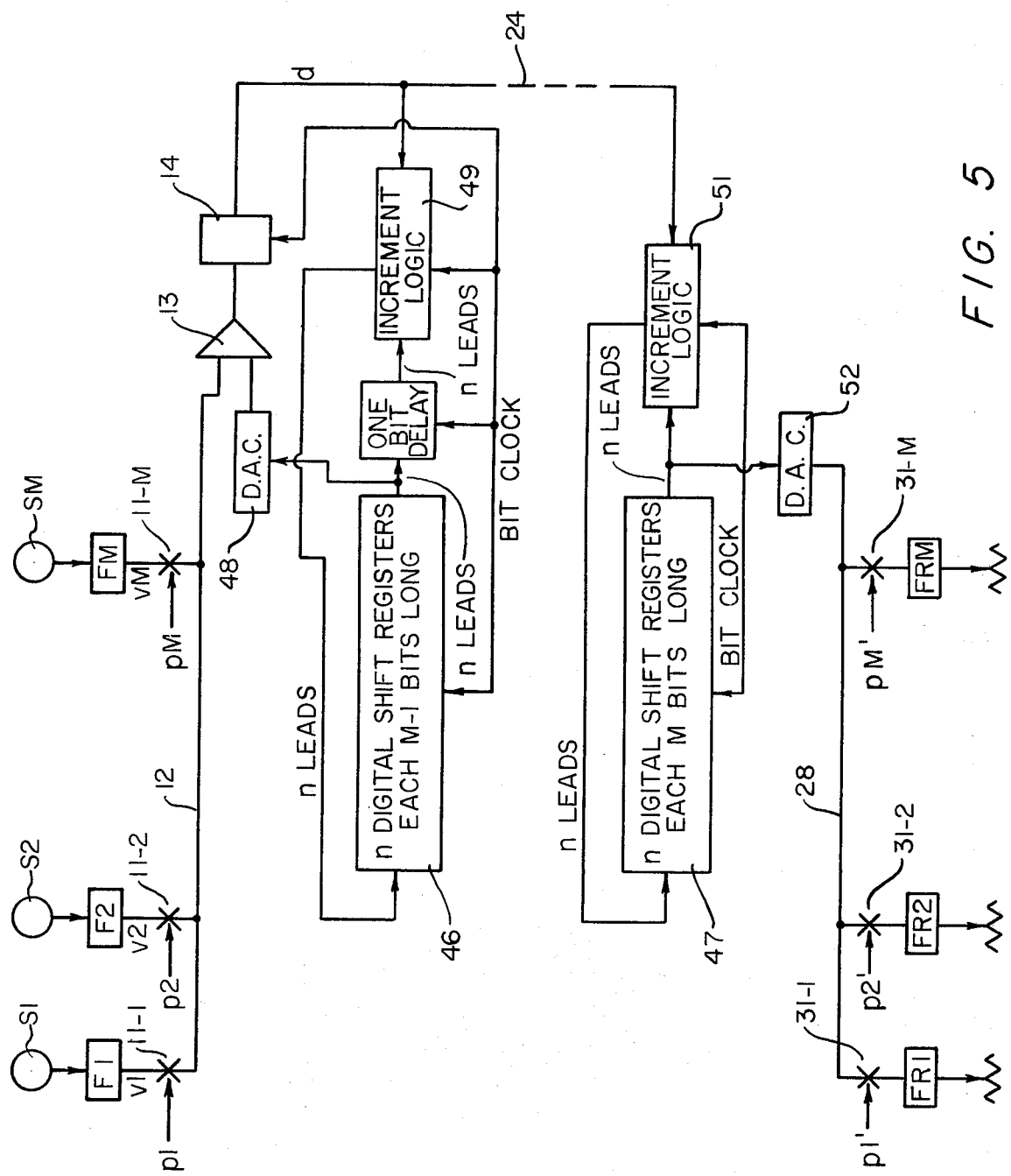
FIG. 5 shows another multi-channel linear differential pulse code modulation system employing digital shift registers.

Referring to FIG. 5, there is shown another multichannel linear delta modulation system. In this system, the analog shift register described in connection with FIG. 4 has been replaced by a digital shift register. Like reference numerals have again been applied to like parts. The digital shift register has been indicated by the numeral 46 for the transmitting terminal and numeral 47 for the receiving terminal. The digital shift register 46 includes M-1 cells while the shift register 47 includes M cells.

It is well known that if the amplitude range of an analog quantity is quantized into $2n$ discrete levels, then such level can be represented uniquely by a binary code word consisting of $n$ bits. A digital to analog converter is a means for converting an $n$-bit binary code word to the corresponding quantized analog amplitude level.

In FIG. 5, which shows the transmitting portion of a system, the individual channel $y$ samples are represented digitally by an $n$-bit binary code word. Each of the $n$ bits circulates through one digital shift register having M-1 cells for an M channel system. There are $n$ such registers, operating in parallel to circulate the complete set of binary code words representing the $y$ samples. The binary shift register, therefore, includes one multi-cell for each binary code word. The registers are clocked by the same clock which operates the decision cell 14. The $n$ outputs of the registers are connected to a digital to analog converter 48. As the set of digital $y$ samples circulates through the register, the corresponding analog $y$ samples appear sequentially at the digital to analog converter output which is connected to one of the comparator inputs. The other comparator input receives the sequence of $v$ samples via the sequentially operated channel sampling gates 11-1 through 11-M.

In each clock interval, a $y$ sample is compared against the corresponding channel $v$ sample. At the end of the interval, the decision shift cell generates the channel digit $d$ resulting from the comparison, and the digital $y$ sample is shifted forward to the increment logic 49. In the next clock interval, the digital $y$ sample is incremented digitally by increment logic 49 which adds or subtracts one binary unit according to whether the delta modulation digit is logic 1 or logic 0. In succeeding intervals, the new $y$ value is re-entered into the $n$ registers and shifted forward through the register for the next comparison. Meanwhile, the $y$ and $v$ samples of other channels are being compared and incremented in sequential order.

The frames of channel digits are transmitted to the receiving terminal where a similar arrangement of $n$ shift registers 47, increment logic 51, and digital to analog converter 52 circulates the digital $y'$ samples, increments them according to the incoming channel digits $d1$ through $dM$ and converts them to corresponding analog quantities for sequential distribution to the respective channels via the transmission gates 31-1 through 31-M. The distribution system and channel filtering are of the type described for FIG. 4.

The incrementing logic at both terminals should include an "end-stop" function which prevents the most positive binary code word from being incremented positively or the most negative binary code word from being incremented negatively. Otherwise, it would be possible to increment the most positive code upwards where it then becomes the most negative code, or vice versa, causing a substantially large error in the value of $y$ or $y'$. It will also be apparent that the digital shift register for the encoder and decoder may comprise a random access memory wherein the digital words may be accumulated, stored and incremented.

In FIG. 5, the $y$ signals are incremented between levels uniquely defined by an $n$-bit binary code. Conversely, in FIGS. 1 and 4, the $y$ signal levels are ill defined and unstable because 1. analog $y$ signals may be perturbed in storage, and
2. any difference between the positive and negative incrementing currents will cause unequal steps in the two directions.

One consequence was a requirement for a receiver integrator leak in FIGS. 1 and 4.

A second consequence is that FIG. 5 is immune to a well known noise mechanism which is inherent in FIGS. 1 and 4. The encoding of zero signal by FIG. 5 generates a $y$ signal which is a squarewave of one step amplitude, stepping across zero after each coding decision. This high frequency squarewave is suppressed by the receiving channel filter and the channel is quiet. In FIGS. 1 and 4, the encoding of zero signal generates a similar squarewave which, because of unequal steps in the two directions, drifts slowly to the direction of larger steps. Eventually it fails to cross zero and the encoding process promptly generates a second step in the same direction which does cross zero. Then the squarewave resumes, with drift. Consequently, the encoded signal is a squarewave superimposed on a low frequency depends on the step ratio for the two directions. At the receiving terminal the sawtooth passes through the channel filter to the channel sink, creating a low level "idle channel sawtooth noise." As noted above, FIG. 5 eliminates this imperfection.

Also, FIG. 5 does not require a receiver integrator leak to dissipate the effect of d.c. offset arising from unequal incrementing currents. However, digital line errors will create d.c. offsets at the receiver and these must be accounted for. Here, the "end stops" of the increment logic provide a mechanism for automatically restoring an offset $y'$ signal to its normal working range. Suppose that a line error burst offsets a $y'$ signal upward such that subsequent positive signal peaks in that channel would exceed the upper limit of the $n$-bit code. Because of the positive end-stop, the first peak cannot increment $y'$ upward, but does increment $y'$ downward on the negative slope following the tip of the peak. Thus, the offset is reduced such that a following peak of the same aplitude would not exceed the range of the $n$-bit code. In effect, the end-stop clamps signal peaks to the code limits and thereby holds $y'$ signals within the system working range. For this reason, FIG. 5 does not require an integrator leak. An important consequence is that the low frequency response of the channel is not limited by integrator leak requirements and can be extended to much lower frequencies than in FIGS. 1 and 4.

Another advantage of the system of FIG. 5 is that because the $y$ and $y'$ samples are stored in digital form, there is no possibility of sample decay in storage, nor of interaction between samples in storage which would result in interchannel cross-talk.

It should now be pointed out that the receiving terminals shown in FIGS. 1, 4 and 5 and the conventional receiving terminal having a decoder for each channel can be interchanged one for the other in the systems of the various figures since the incoming signal is a digital signal containing logic 1 and logic 0.

The transmitting terminal in FIG. 5 is a multi-channel analog-to-digital converter which converts analog samples $v$ into binary coded approximation signals $y$. Channel $y$ signals are available for further digital signal processing such as digital filtering. In particular, the channels $y$ samples could be gated out of the storage registers of standard pulse code modulation rates and processed by a digital compandor into a standard PCM fomat. Thus, with additional logic, the terminal can become a PCM transmitting terminal.

In the foregoing examples, linear delta modulation has been described and employed. It is apparent that the bit rate required for linear delta modulation may be unreasonably high if the slope overload distortion is to be held within acceptable limits, that is, if the $y$ signal must follow a rapidly changing $v$ signal. Adaptive delta modulation has been developed to provide good slope following performance at lower digital bit rates.

In an adaptive delta modulation system, the step size of the approximating signal is varied according to the signal conditions. Step size is small when the approximating signal is following a slowly changing input signal and large when the signal is following a rapidly changing input. This leads to higher quantizing noise through fast slope intervals but this is generally not detrimental because fast slopes imply large signal amplitudes. The parameter which measures system quality is the signal-to-noise ratio. This ratio is not degraded if quantizing noise is proportional to signal amplitude. Various methods have been proposed to implement adaptive delta modulation. Among these are digitally controlled methods wherein the control of step size at the encoder and decoder is derived from the delta modulation digital bit stream. These methods facilitate good tracking between encoder step size and decoder step size because both ends see the same bit steam.

The fundamental principle of digital control is the following. If the coder input has fast slope and the coder step size is small, then the digital output is a sequence of like bits, all logic 1 or all logic 0. Conversely, if the coder input has slow slope, and the coder step size is large, then the digital output has many alternations between logic 0 and logic 1. Thus, observation of the digital bit stream over reasonable time intervals provides information as to the relative match between signal slope and approximating step size.

Various algorithms have been proposed for controlling the step size of the encoder and decoder as a function of the delta modulation digital signal. One such algorithm is quoted below for illustrative purposes. This algorithm is used in the delta modulators of a subscriber carrier system manufactured by the Western Electric Company. This system uses 8 different step sizes. If the smallest step size is normalized to one unit, the eight step sizes are 1, 2, 4, 8, 16, 32, 64 and 128 units. The system can rest on one step size or can move up or down from one step size to the next but cannot move more than one step size at a time. The adaptation algorithm is: (a) If the last change in step size was an increase, seven consecutive like bits are required for another increase in step size, but four consecutive alternating bits are required for a decrease in step size: and (b) if the last change in step size was a decrease, seven consecutive alternating bits are required for another decrease in step size, but three consecutive like bits are required for an increase in step size.

This algorithm is chosen for illustrative purposes because it is relatively complex. The adaptive delta modulation encoders and decoders which implement it each require the following functionnal parts: (1) a current source which provides current of one of eight binary weighted magnitudes, and of either sign; (2) logic which stores information as to present step size, and controls the current source magnitude therewith; (3) logic which stores the sign of the last change in step size; (4) logic which stores the preceding six bits of the delta modulation digital signal; (5) algorithm logic responsive to the present and six proceding code bits (stored in 4) and to the sign of the last change (stored in 3) which increments (2) to change the step size up or down, and also updates (3).

Figure 6:
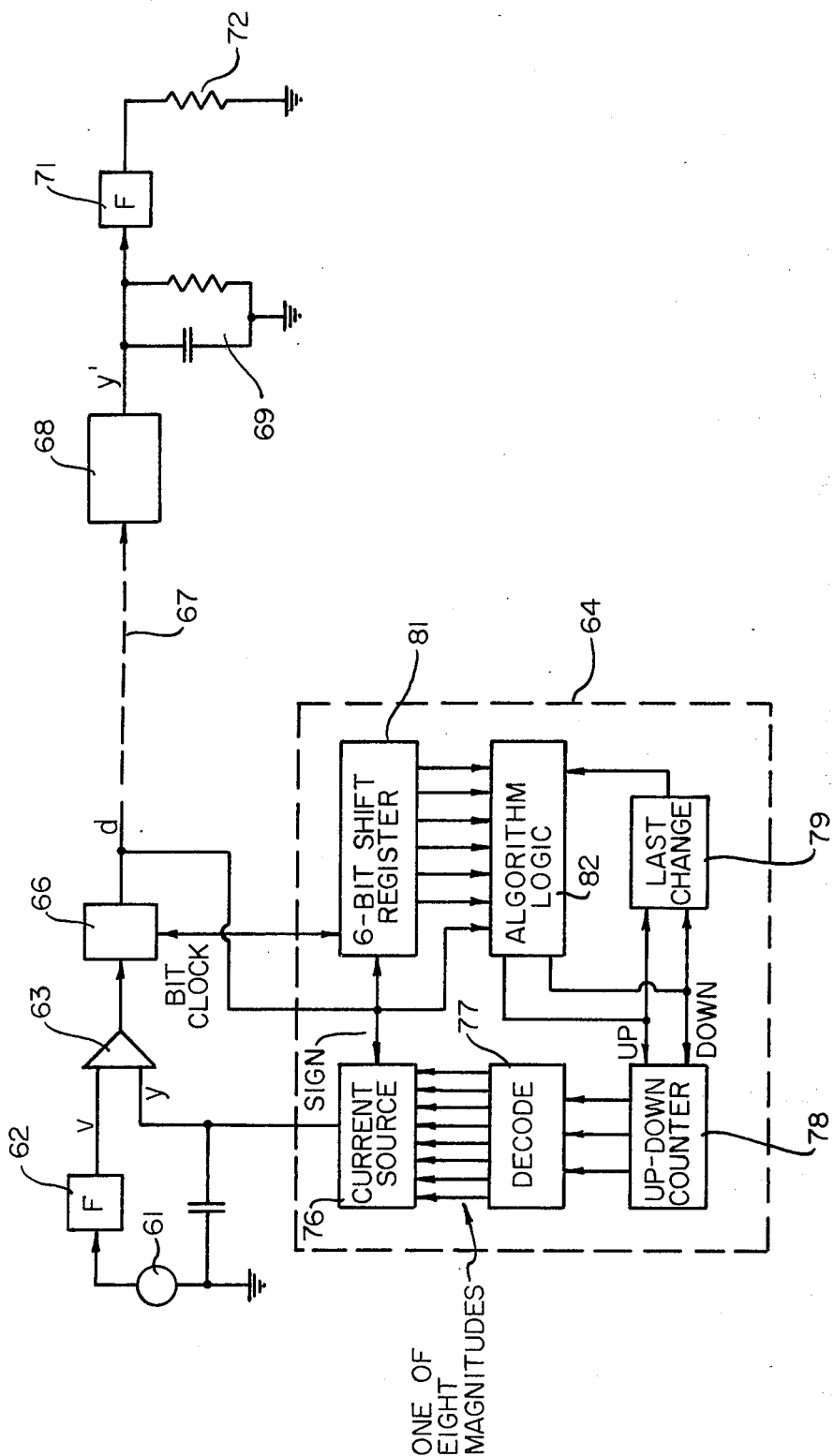
FIG. 6 shows a single channel adaptive delta modulation system.

FIG. 6 shows a schematic block diagram of a single channel adaptive delta modulation system which uses the cited algorithm. The analog signal source is shown at 61 with its output applied to a filter 62, whose output is the analog signal $v$ applied to comparator 63. The other input of the comparator is the stepped approximation signal $y$ stored on a capacitor. Signal $y$ is incremented after each coding decision by means of the current source and digital logic, all indicated by the dotted block 64. The output of the comparator is applied to shift cell 66 whose output is the digital signal $d$ which is transmitted via the transmission facility 67 to a receiving terminal. The block 68 corresponds to the block 64. The output is applied to a leaky integrator 69 which stores the stepped approximation signal $y'$ and thence to filter 71 and signal sink 72.

The functional elements listed above for the particular adaptive delta modulation encoder and decoder are shown in the block 64 and include current source 76 which can increment the stepped approximation signal $y$ by one of eight step sizes in either direction. The sign of the incrementing current is determined by the present coding digit. The magnitude of the incrementing current is controlled by logic 77 which decodes step size information stored in binary coded form in three-bit up-down counter 78, which is incremented up or down by the output of algorithm logic 82. The counter 78 includes "end-stop" logic so that if the counter is at minimum step size it cannot increment down, or if the counter is at maximum step size it cannot increment up. The up or down command to the counter 78 is also applied to latch 79 which stores the sign of the last change in step size. A six-bit shift register 81 stores the preceding six coding digits. These, and the current coding digit, and the sign of the last change in step size; are the eight inputs to the algorithm logic 82. The algorithm logic increments the counter 78 according to the adaptation rules previously quoted.

Regardless of the detailed implementation, the point to be made is that the adaptive delta modulation channel is far more complex than the linear delta modulation channel. Thus, the economical benefits of time sharing the encoding and decoding equipment in multi-channel systems are substantially greater for adaptive systems then for linear systems. The adaptive algorithm described above is quasi-instantaneous in that it can change step size in a few bit times. Thus, in the course of encoding a sinewave, the step size can change several times within a single cycle. There is a potential problem in maintaining the same step size at the encoder and decoder. Because of digital transmission errors, the digital bit stream at the decoder may not be identical to that as the encoder. Such errors may cause the decoder to commit or omit step size changes different from those of the encoder. After such an event, the two ends are operating with different step sizes and the net gain of the channel is altered accordingly. However, this problem is automatically corrected for many classes of information signal. If the information signals contain frequent intervals of zero signal, then the encoder dwells on the minimum step size in those intervals and transmits alternating bit patterns to the decoder. This pattern will cause the decoder to move to minimum step size. Thus, the two ends will reestablish identical step sizes automatically during these zero-signal intervals. Such would be the case for a channel transmitting speech signals. On the other hand, other information signals may not contain sufficient zero-signal intervals to guarantee resynchronization. In such cases it is desirable to include provisions for periodically updating the decoder step size to agree with the current encoder step size. Means of this type have not been shown in FIG. 6, however, they will be discussed in connection with a multi-channel time shared adaptive delta modulation system to be described.

One method of solving this step size tracking problem is to add an update channel to each multi-channel transmission frame. In the case of eight step sizes, the update channel would require 3 bits. Frames are numbered 1 through M, where M is the number of channels. In frame 1, the update word is assigned to channel 1; in frame 2 to channel 2, and so on, and each update word carries the current step size of the assigned channel. At the receiver, the incoming update words are used to set the current step size in the assigned channel. As each decoder is updated once every M frames, transmission error in the update channel will set the wrong step size in the decoder but this will be corrected M frames later. This update strategy consumes 3 bits per frame to update each of M channels once every M frames. The Western Electric subscriber carrier system previously referred to employs step size updating of this general type.

Figure 7:
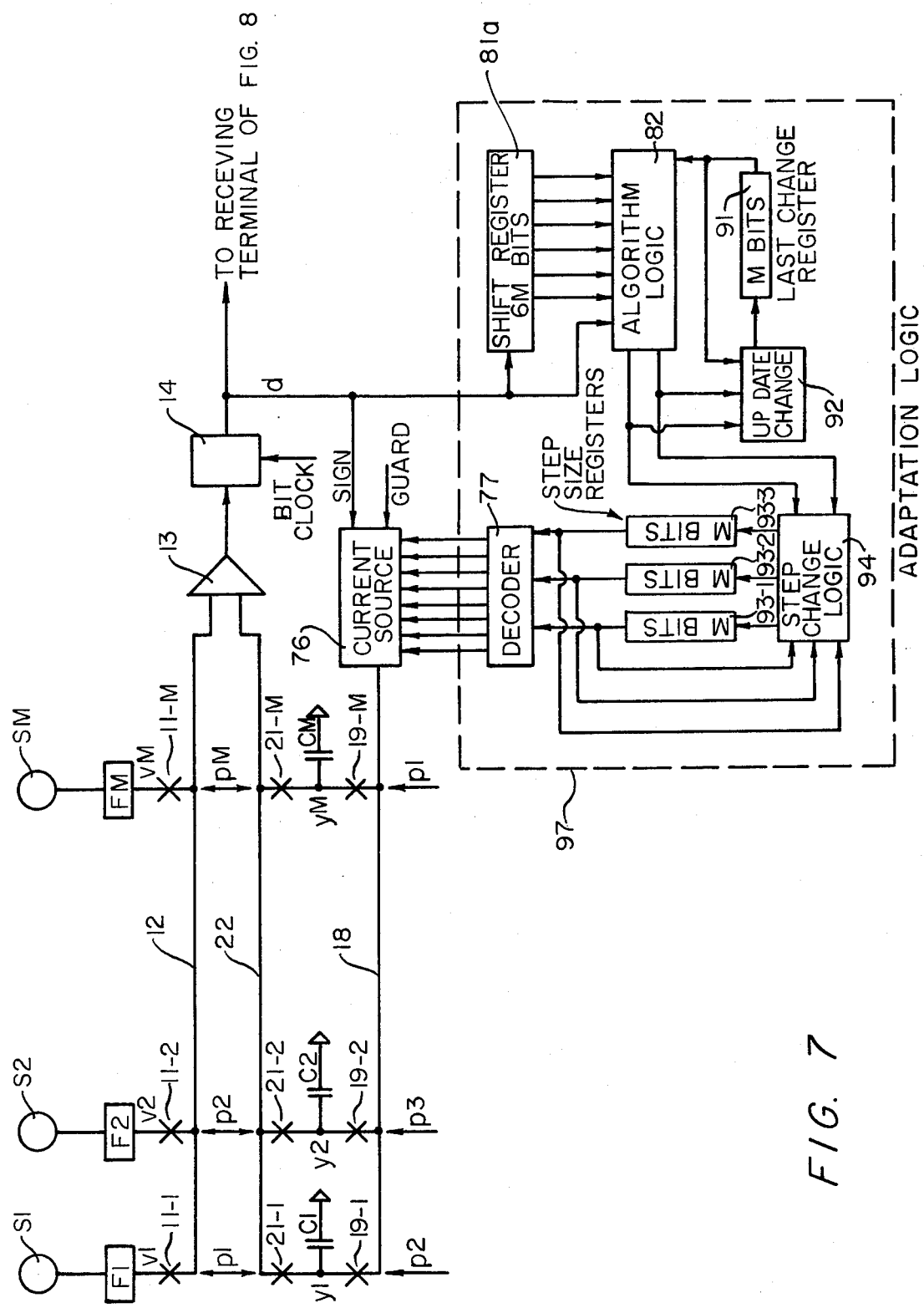
FIG. 7 shows a multi-channel adaptive delta modulation transmitting terminal in accordance with the invention.

FIG. 7 shows a multi-channel adaptive delta modulation transmitting terminal having accumulators similar to FIG. 1 and employing a time shared adaptive encoder of the type described with reference to FIG. 6. The reference numerals employed in connection with FIG. 1 are applied to like parts in FIG. 7, while the reference numerals employed in FIG. 6 are applied to like parts in FIG. 7. All the shift registers in FIG. 7 are clocked by the same bit clock waveform which clocks the decision shift cell 14. A shift register 81a stores the six preceding bits of each channel. When a channel 1 bit is present at the register input, the first preceding channel 1 bit rests at the output of the M stage of the register. The second preceding channel 1 bit rests at the output of the 2M stage of the register, etc. Therefore, the register is tapped at stages M, 2M, 3M, 4M, 5M, 6M to provide the six previous channel 1 bits. In the next time slot, the register input bit is the current channel 2 bit and the six previous channel 2 bits appear on the same six taps from the register. M-bit shift register 91 circulates the last change information for each channel, that is, the M bits circulating in the register indicate, for each channel, the sign of the last change in step size for that channel. These bits appear sequentially at the register output connected to the algorithm logic 82 simultaneously with the seven digital code bits of the corresponding channel. When the algorithm logic calls for a change in step size, the input to register 91 is updated accordingly through the update logic 92. Otherwise, the last change bit passes through the update logic unaltered. In FIG. 7, this M bit shift registers 93-1, 93-2 and 93-3 operate in parallel to circulate the step size information in binary coded form. The M sets of three bits represents, for each channel, the magnitude of the step size of that channel. These 3-bit words appear sequentially as inputs to decoder logic 77, which provides one-of-eight magnitude information to the current source 76, synchronously with the corresponding channel digits, which determine the sign of current source 76. Thus, each channel accumulator is incremented in turn by current source 76, with step sizes determined by the 3-bit words circulating in registers 93. The 3-bit step-size words are also applied to step change logic 94, simultaneously with step change instructions if any, for that channel, from the algorithm logic. If not change in step size is required, the same 3-bit word enters the registers 93. If the algorithm logic calls for a change in step size, the step size logic adds or subtracts one (in binary arithmetic) to the 3-bit binary code, and the new step size instruction enters the registers 93, to be used M bits later for the next incrementing of that channel accumulator. The step change logic 94 also contains "end-stops" so that if the step size code is maximum, it cannot be augmented, or if the step size code is minimum, it cannot be diminished. The current source in FIG. 7 is the same as that described in FIG. 6 except for the inclusion of a "guard pulse" which forces the current source output to zero for a brief interval in order to avoid inter-channel cross-talk. In FIG. 7 all of the digital logic required for adaptation of the coding step size is contained within dotted block 97.

FIG. 8 shows the multi-channel adaptive delta modulation receiving terminal associated with the transmitting terminal of FIG. 7. The current source 76 and the digital adaptation logic 97, clocked by the receiving terminal bit clock, are the same as those shown in FIG. 7, and are time-shared among all channels. The receiving accumulators and distribution systems are as shown in FIG. 1.

Figure 9:
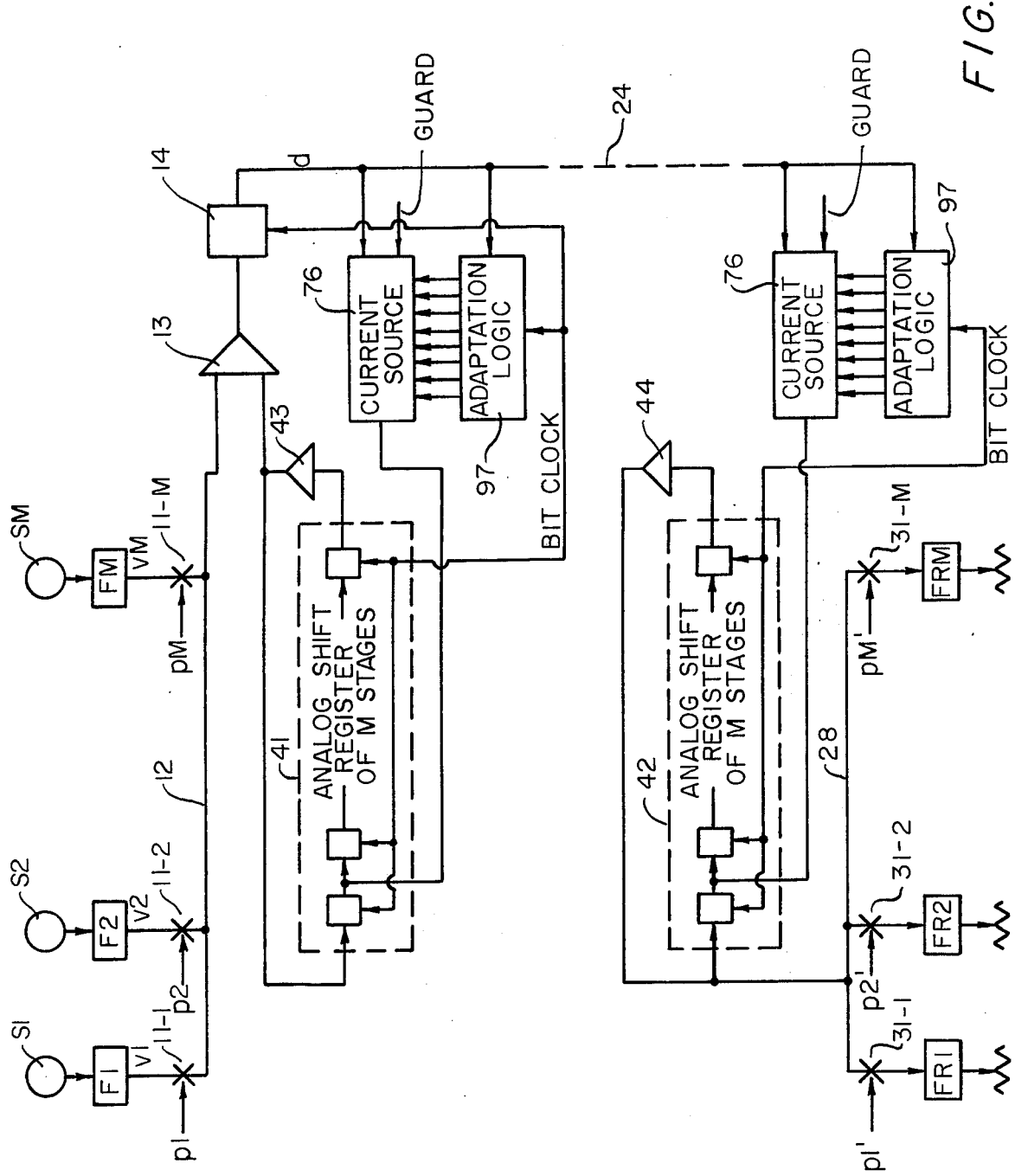
FIG. 9 shows a multi-channel adaptive delta modulation system employing analog shift registers.

FIG. 9 shows a multi-channel adaptive delta modulation system employing analog shift registers. This is the adaptive version of the linear systems shown in FIG. 4.

Figure 10:
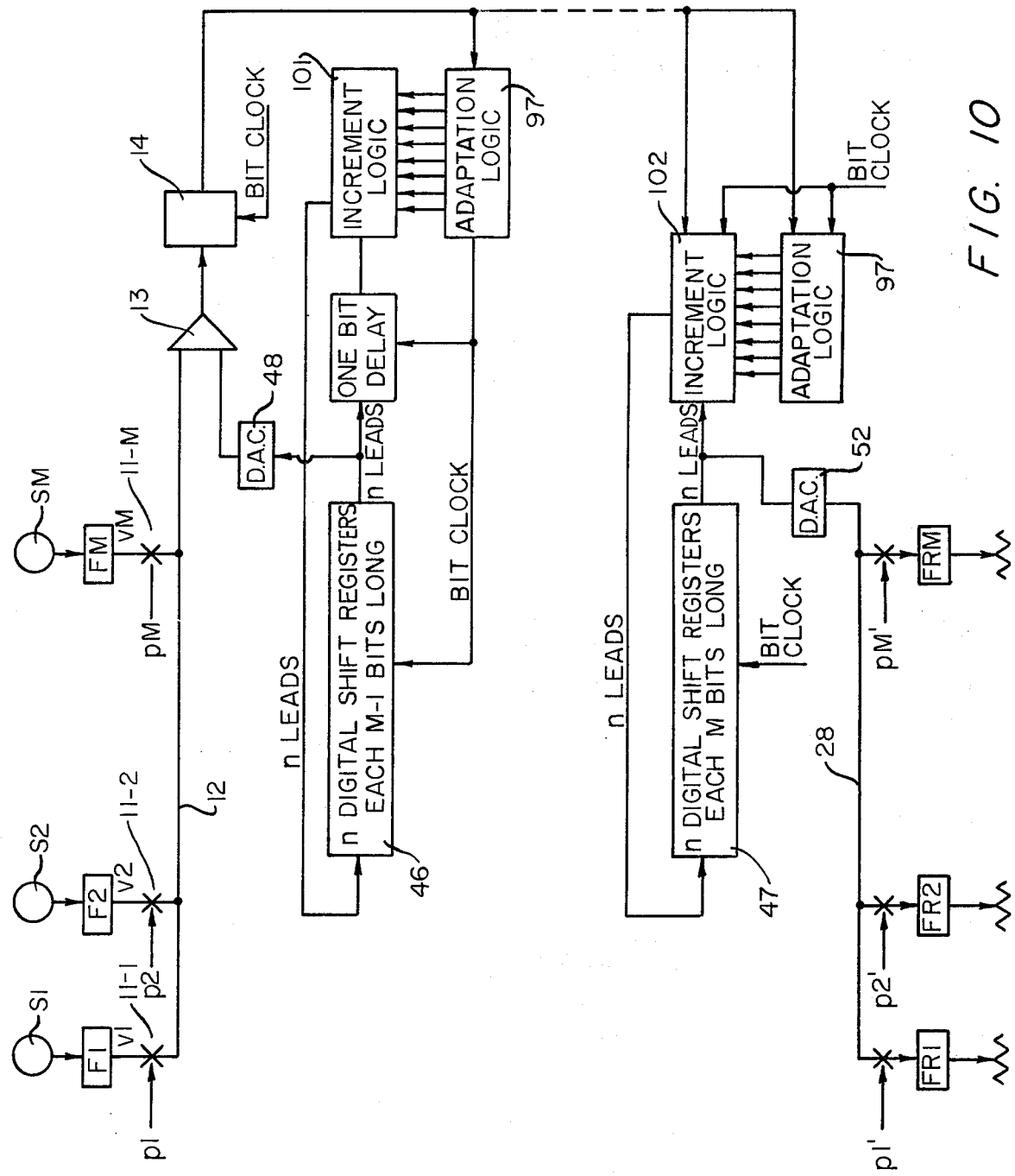
FIG. 10 shows a multi-channel adaptive delta modulation system employing digital shift registers.

FIG. 10 shows a multi-channel adaptive delta modulation system employing digital shift registers. This is the adaptive version of the linear system shown in FIG. 5. In FIG. 10 the approximating signals $y$ and $y'$ are stored and incremented in digital form and all of the advantages described with reference to FIG. 5 also apply to FIG. 10. In FIG. 10, the increment logic 101 and 102 increments the binary coded $y$ and $y'$ samples by adding or subtracting (in binary arithmetic) the 8-bit output of the adaptation logic 97. This 8-bit word is the decoded value of the present step size and contains seven 0's and one 1. Therefore, it represents either 1, 2, 4, 8, 16, 32, 64, or 128 code units and the $y$ or $y'$ samples are incremented by this amount. The increment logic includes "end-stops" such that the binary codeed $y$ and $y'$ samples cannot be incremented beyond the erange (i.e., past the end limits) of the binary code words used to represent them. As was the case in FIG. 5, the transmitting terminal of FIG. 10 is a multi-channel analog-to-digital converter which converts analog samples $v$ into binary coded approximation signals $y$. Channel $y$ signals are available for further digital signal processing such as digital filtering or conversion to companded PCM format.

Finally, it is noted that the receiving terminals shown in FIGS. 8, 9 and 10, and conventional receiving terminal having an adaptive decoder for each channel can be interchanged one for the other in the systems of the various figures.

Thus, it is seen that the present invention provides time sharing of the delta modulation encoder-decoder whether the encoder-decoder is of the linear delta modulation type or of the adaptive delta modulation type. In either instances, but particularly in the instance of adaptive delta modulation, the time sharing of the decoder and encoder provides economies not obtainable with prior art systems.

I claim:

1. A multi-channel delta modulation encoder for converting a plurality of analog signals to frames of binary digits with the binary digits corresponding to each analog signal being a delta modulation encoding of the corresponding analog signal; comprising, sampling means for periodically sequentially sampling said analog signals to form recurring frames of analog signal samples each frame including one signal sample for each analog signal, accumulating means serving to store an approximating signal for each analog signal, means connected to said accumulator means forming recurring frames of said approximating signal samples each frame including one approximating signal for each analog signal, comparison means serving to receive the frames of analog signal samples and approximating signal samples and generate output signals indicative of the algebraic sign of the difference between each analog signal sample and the corresponding approximating signal sample, means responsive to the output signal from the comparison means for producing said frames of binary digits, and incrementing means responsive to said frames of binary digits for incrementing by increasing or decreasing the approximating signal samples for each channel durinng each frame in accordance therewith, said incrementing means serving to increment the approximating signal sample for each channel while the comparison means is operating on the next channel.

2. A delta modulation encoder as in claim 1 in which said incrementing means increases or decreases the approximating signals by the same amount in every frame.

3. A delta modulation encoder as in claim 1 in which said incrementing means increases or decreases the approximating signal for each channel in accordance with an adaptation algorithm which is responsive to one or more preceding encoded bits for the corresponding channel.

4. A delta modulation encoder as in claim 2 in which said accumulating means includes a capacitor for each channel, and said incrementing means includes a current source having an output current of sign determined by the binary digits and means for sequentially connecting the current source to said capacitors to increment the approximating signals for each channel once each frame.

5. A delta modulation encoder as in claim 3 in which said accumulating means includes a capacitor for each channel, and said incrementing means includes a current source having an output current of sign determined by the binary digits and magnitude determined by said adaptation algorithm and means for sequentially connecting the current source to said capacitors to increment the approximating signal for each channel once each frame.

6. A time shared delta modulation encoder as in claim 1 in which: the accumulating means is a recirculating analog shift register with one cell for each channel serving to recirculate the approximating signals, said means forming recurring frames of approximating signal samples including means for continuously clocking the register so that the approximating signals appear sequentially at the shift register output, said incrementing means including a current source having an output current of sign determined by the digits, connected to one cell of said shift register to increment the approximating signal for each channel as it passes through said cell once each frame.

7. A time shared delta modulation encoder as in claim 6 in which the current magnitude is fixed 8. A time shared delta modulation encoder as in claim 6 in which the current magnitude is increased or decreased in accordance with an adaptation algorithm which is responsive to one or more preceding encoding bits for each channel.

9. A time shared delta modulation encoder as in claim 1 in which the approximating signals are stored and incremented in digital binary coded form, said accumulating means comprising a recirculating digital shift register having one multi-cell for storing the digital binary code word for the approximating signal for each channel, said means forming recurring frames of approximating signal samples including means for continuously clocking the digital shift register so that the digital binary coded approximating signals appear sequentially at the register output and a digital to analog converter for converting the binary code words to analog form for application to the comparison means, said incrementing means including a digital algebraic adder between the register output and the register input whereby each binary coded approximation signal is digitally incremented and re-entered into the register.

10. A time shared delta modulation encoder as in claim 9 in which the digital approximating signals are increased or decreased by one binary unit during each frame.

11. A time shared delta modulation encoder as in claim 9 in which the digital approximating signals are increased or decreased in accordance with an adaptation algorithm which is responsive to one or more preceding encoded bits of the corresponding channel.

12. A time shared delta modulation encoder as in claim 9 in which said incrementing means includes means for preventing the most positive binary word from being incremented positively or the most negative binary word from being incremented negatively.

13. A time shared delta modulation encoder as in claim 1 in which the approximating signals are stored and incremented in digital binary coded form, said accumulating means comprising means for storing the binary code word for the approximating signal for each channel, means connected to said storing means for sequentially providing said binary code word for each channel and a digital to analog converter for converting the binary code words to analog form for application to the comparison means, said incrementing means including a digital algebraic adder connected to the storage means to digitally increment each binary coded approximating signal.

14. A time shared delta modulation encoder as in claim 13 in which the binary coded digital approximating signals are increased or decreased by one binary unit during each frame.

15. A time shared delta modulation encoder as in claim 13 in which the binary coded digital approximating signals are increased or decreased in accordance with an adaptation algorithm which is responsive to one or more preceding encoded bits of the corresponding channel.

16. A timed shared delta modulation decoder for converting frames of binary digits representing the multi-channel delta modulation encoding of a plurality of signal sources, each frame containing one binary digit for each channel, to corresponding frames of approximating signal samples for sequential distribution to interpolation filters associated with corresponding signal sinks comprising:

storage means in the form of a recirculating analog shift register, having one cell per channel, with the output of the analog shift register connected through a summing amplifier to its input to form a loop;

means for clocking the analog shift register whereby the channel approximating signal samples circulate continuously through the analog shift register;

incrementing means connected to receive said frames of binary digits and apply corresponding analog increment signals to said analog shift register whereby the approximating signals for each channel are sequentially incremented once per frame in accordance with the corresponding input binary digit; and means for causing the loop gain around the analog shift register to be slightly less than unity whereby the circulating approximating signals suffer slow exponential decay in order to dissipate the effects of incidental transmission errors in the binary input signal and also dissipate the effects of incidental unbalance in the positive and negative increments.

17. A multi-channel delta modulation system including a delta modulation encoder for converting a plurality of analog signals to frames of binary digits with the binary digits corresponding to each analog signal having a delta modulation encoding of the corresponding analog signal comprising:

sampling means for periodically sequentially sampling said analog signals to form recurring frames of analog signal samples each frame including one signal sample for each analog signal;

accumulating means serving to store an approximating signal for each analog signal, means connected to said accumulating means forming recurring frames on said approximating signal samples, each frame including one approximating signal for each analog signal;

comparison means serving to receive the frames of analog signal samples and approximating signal samples and generate output signals indicative of the algebraic sign of the difference between each analog signal sample and the corresponding approximating signal sample;

means responsive to the output signal from the comparison means for producing said frames of binary digits;

incrementing means responsive to said frames of binary digits for incrementing by increasing or decreasing the approximating signal samples for each channel during each frame in accordance therewith, said incrementing means serving to increment the approximating signal sample for each channel while the comparison means is operating on the next channel;

means for transmitting said frames of binary digits;

a delta modulation decoding means connected to receive said frames of binary digits and generate frames of incrementing signals one for each channel;

accumulating means for storing the approximating signal for each analog signal; and means for applying said frames of incrementing signals to said accumulating means to increment the stored approximating signals for the corresponding analog signal.

18. A multi-channel delta modulation system as in claim 17 in which said accumulating means for storing the approximating signal for each analog signal comprises an accumulating capacitor for each channel.

19. A multi-channel delta modulation system as in claim 18 in which said incrementing means increments said approximating signal by the same amount in every frame.

20. A multi-channel delta modulation system as in claim 18 in which said incrementing means increments said approximating signal by an amount determined by an adaptation algorithm which is responsive to one or more preceding encoded digits of the corresponding channel.

* * * * *